3,347,266
SPRING BIASED RELIEF VALVE
Gary L. Hansen, Pomona, Calif., assignor to General Dynamics Corporation, Pomona, Calif., a corporation of Delaware
Filed Sept. 19, 1963, Ser. No. 310,175
4 Claims. (Cl. 137—540)

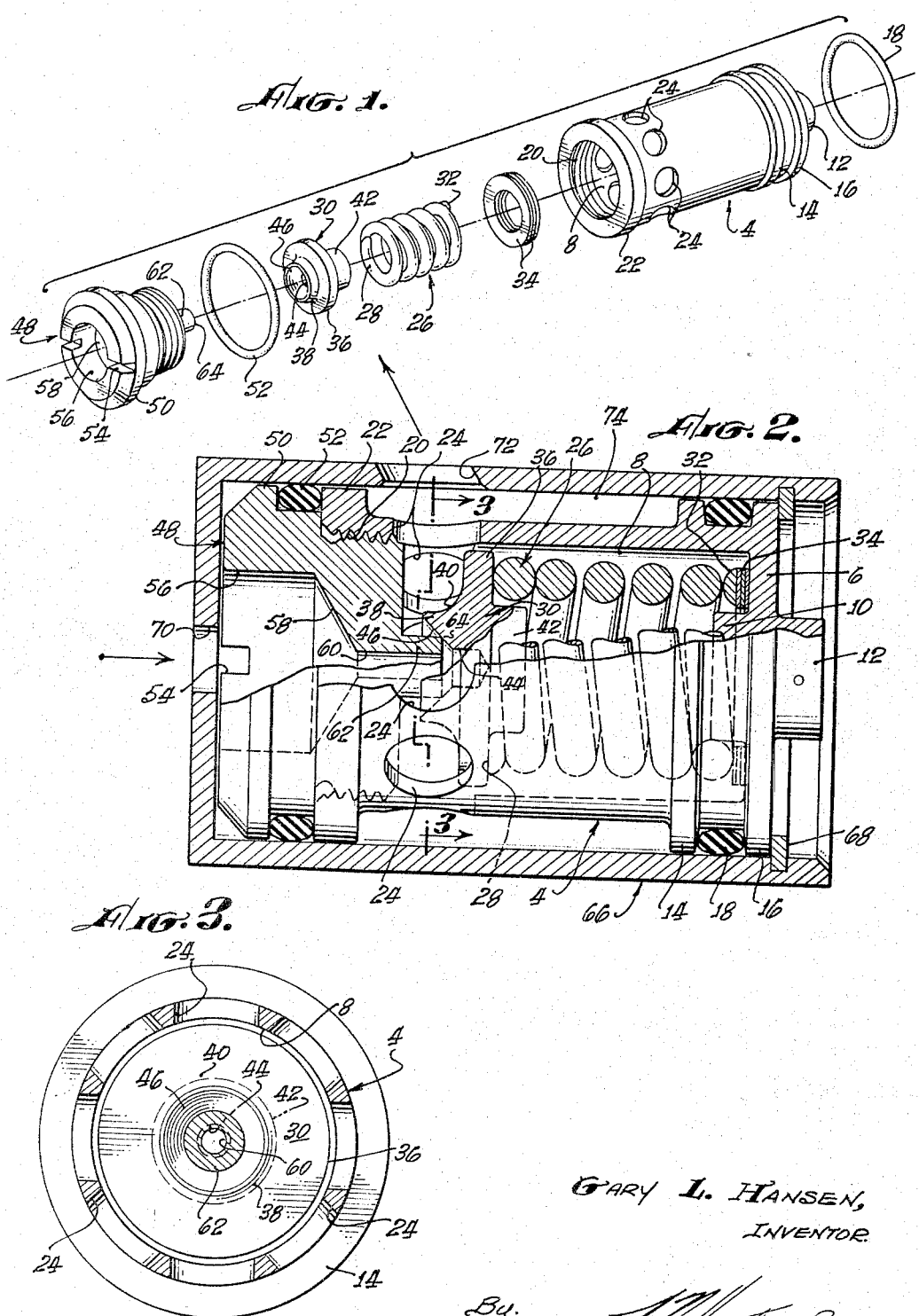

This invention relates in general to valves and more particularly to an improved relief valve having particular utility for the regulation of operating pressures in solid propellant hot gas generating systems.

The regulation of pressure in a solid propellant hot gas generating system is very important since the burning rate of the solid propellant is an exponential function of the operating pressure and the environmenal temperature. Hence, very large variations in the output of a particular gas generator can occur over a range of environmental temperatures, unless a relief valve is used to maintain the supply pressure and the power to a system at a constant level. In systems where a gas generator is the source of power for a servo mechanism or an auxiliary power supply, a relief valve is generally a necessity since deviations from the designed gas generator output critically affect system efficiency and performance. Also, regulation of the pressure level minimizes over-design of system components, allowing optimization.

Accordingly it is an object of this invention to provide a relief valve capable of pressure regulation in hot gas generating systems.

It is another object of this invention to provide a relief valve which is of broad application in installations calling for relief valves of high reliability.

Still another object of this invention is to provide a relief valve which is stable in its operation; is substantially free of pressure oscillation irregularities; and which has excellent leakage and regulation characteristics over a wide temperature range.

A further object of this invention is to provide a relief valve which is readily adapted to provide different predetermined pressure flow rates in accordance with the requirements of a given installation.

Yet a further object of this invention is to provide a relief valve which by virtue of its simple and rugged construction is capable of reliable operation in vibration, shock and acceleration environments and which resists fouling.

Still a further object of this invention is to provide a valve which is simple and durable in construction and readily and cheaply manufactured employing a few component parts.

Other objects and advantages of this invention will become apparent from the following description and from the drawing in which:

FIG. 1 is an exploded view of the valve;

FIG. 2 is a view in elevation of the assembled valve partially broken away and cross-sectioned to disclose valve interior details; and FIG. 3 is a view in cross section taken on the line 3—3 of FIG. 2.

In brief, a preferred embodiment of the invention comprises a valve body, walls of which define a cavity within which a poppet member is disposed for axial movement. The poppet member is provided with a nose portion recess shaped to seat upon a protuberant tip of an inlet or gas-admitting conduit to afford reliable closure against gas passage into the body cavity. Biasing means are provided to maintain the poppet in seating abutment with the protuberant tip until a sufficient or cracking pressure is exerted by the gas within the inlet conduit to force the poppet from its seat, at which time the gas is directed radially outward by the poppet through a plurality of outlet apertures girdling the valve body.

Turning now to the details of construction of the preferred invention embodiment, particularly shown in FIGS. 1 and 2, the valve of this invention is comprised of a cylindrical body 4 of a durable material such as stainless steel. The body is provided with an end wall 6, which with the body wall defines an interior cavity or chamber 8 of cylindrical shape open at one end. Integral with and located centrally of wall 6 are generally cylindrical interior and exterior bosses or projecting members 10 and 12. Spaced apart parallel flanges 14 and 16 encircle the closed end of the body and intermediate thereto is received an O-ring 18. "Viton A" has been found to be an excellent material for the O-ring.

The other or open end of the valve body is provided with inside threads 20 and an encircling outwardly extending flange 22. As shown in FIG. 3, there are located adjacent this flange a plurality of wall-penetrating circular outlet apertures 24 uniformly spaced apart in a ring the plane of which is at right angles or normal to the cavity longitudinal axis.

A helical spring 26 is disposed within and extends generally axially of the chamber 8, bearing at its outer end 28 upon a poppet member 30 and at its inner end 32 upon shims 34 interposed between the spring end and the body end wall 6. It is important that spring 26 be carefully constructed to provide for proper valve seating, as presently explained. To this end spring 26 is provided with closed square ends, as by grinding. Treated inconal has been found to be a preferred material for the spring 26. Shims 34 permit adjustment of spring pressure and hence the pressure at which the valve will crack or open. The number and thickness of the shims therefore depend upon the particular requirements of the valve installation.

Poppet member 30 is shaped with an annular flange 36 extending about its central portion and to one side thereof a coaxially extending seat-abutting nose portion 38, the surface 40 of which flares outwardly over a gentle radius, and to the other side a flat faced boss or spring-aligning portion 42. The nose portion 38 is provided with an axially disposed cavity 44 which at its outer end is provided with a frustoconical surface 46. It is important that this surface be of an accurate shape so as to provide a line contact seal and that there be no galling of the frustoconical surface during assembly of the valve. A special tool, presently described, is provided in order to permit valve assembly without such galling. The frustoconical shape is particularly effective as a shape which provides for line contact sealing and for ease of production as well. As shown in FIG. 2, the outer end 28 of spring 26 bears upon poppet flange 36 to bias the poppet forwardly, or to the left as viewed in FIG. 2, to abut closure member 48 in effecting valve closure. Boss 42 serves to maintain spring 26 in axial alignment with the poppet to accomplish accurate poppet seating and valve closure.

Closure member 48 is comprised of a chamfered front portion 50 which defines an annular flange, immediately to the rear of which is disposed an O-ring seal 52, which latter performs a function, presently described, similar to O-ring seal 18 and may be made of a similar material. A slot 54 extends diametrically of front portion 50 for reception of an assembly tool blade and a cylindrical cavity 56 is disposed centrally of member 48 to terminate in a reduced frustoconical cavity 58, the latter in turn terminating in a central valve inlet conduit 60. A protuberant tip 62 of cylindrical shape is located centrally of member 48 to project rearwardly thereof to define at its outer rear margin a circular seat 64 adapted for abutment in line sealing relationship with frustoconical surface 46 of poppet 30. In FIG. 2 the closure member 48 is shown threadedly retained to effect closure of the open end of valve body 4 through engagement with its threads 20. Tip 62 extends rearwardly into the valve body to a position generally opposite the apertures 24 ranged about the periphery of the valve body.

In FIG. 2 the valve is shown fully assembled and installed within a hot gas pressure system manifold 66, being secured therein through use of a snap ring 68. Provided in manifold 66 are an inlet conduit 70 and an outlet conduit 72. As will be observed, the assembled valve is installed within the manifold as a unit or cartridge with the O-rings 18 and 52 serving as sealing means at either end of the valve assembly. This is a convenient manner of installing the valve which permits its ready installation and removal. However other means may readily be visualized.

It has heretofore been indicated that a special tool is required in assembly of the valve to prevent galling of its sharp edged seat. This tool (not shown) includes a center post which passes through the valve inlet 60 and pushes the poppet 30 away from abutment with the protuberant tip 62 of closure member 48 at the same time as it engages in the slots of the closure member for threading same into the valve body 4.

Referring to FIG. 1 in now describing valve operation, hot gas is fed through manifold inlet conduit 70 into cavity 56 and thence through cavity 58 and valve inlet 60. Poppet member 30 is preloaded or biased by spring 26 against circular seat 64 to maintain an effective line seal and prevent gas flow. It is to be noted that because of this line seal, fouling of the valve is resisted, as this seal cuts through contamination which might otherwise build up. This is an important consideration where hot gas is being handled. When a sufficient or cracking pressure is exerted upon the poppet as a result of gas admitted through conduit 60, the poppet is caused to unseat. The gas is then directed by poppet surfaces 46 and 40 to move radially outward and thence through apertures or exhaust ports 24 into a cavity 74 intermediate the valve body 4 and the manifold 66. From cavity 74 the gas exhausts to atmosphere through the manifold outlet conduit 72. As the poppet unseats responsive to an imposed pressure, it is guided only by the spring 26 and in its reseating by the spring and the protuberant tip 62. The importance of the square ended spring is therefore apparent and it has been found that this spring should be fully closed at its ends and ground square, preferably within one-half of a degree. At the same time it is noted that by carefully controlling the spring configuration and directing its biasing force axially of the valve body, complicated and troublesome valve guidance accessories are eliminated. Further, from the above description it is evident that the valve of this invention eliminates the necessity for insulators, heat reflectors, viscous damping reservoirs, belleville washers, springs, and ball elements, frequently employed in other valves intended for like applications.

The excellent regulating characteristics of the valve of this invention are in large part attributable to the unguided poppet member 30. The frustoconical cavity of the poppet provides a tight seal and will not stick or lodge on the circular seat 64. With a high spring rate, the lightweight poppet provides fast response and insensitivity to vibration, shock and acceleration. The valve is further easily adapted to provide different pressure flow characteristics. Thus the poper 30, seating as it does upon the circular seat 64, provides with the valve inlet 60 two restricting orifices in series. In applications where it is desirable to contain a high boost pressure, the inlet duct may be made very small to increase the slope of the pressure-flow rate curve. For applications where it is desirable to maintain a fairly constant pressure for all flows the inlet duct may be made larger, Although the invention has been described above with respect to a particular preferred embodiment, it is to be understood that it may be modified, altered or changed without departing from the spirit and scope of the appended claims.

What I claim is:
1. A fluid relief valve comprising:
  (a) a first body member, said first body member being open at one end thereof to define a chamber therein, said first body member including a flange portion at the open end thereof, and being provided with internal threads and at least one aperture adjacent said flange portion, said first body member additionally including an inwardly extending protuberant portion at the closed end thereof;
  (b) a second body member threadedly interconnected with the internal threads of said first body member, said second body member being provided with a protuberane portion extending into said chamber of said first body member and terminating in a circular configuration, said second body member being provided with an aperture extending therethrough, said aperture being coaxial with respect to said protuberant portion of said second body member;
  (c) a poppet member movably positioned within said chamber of said first body member, said poppet member including a central portion and reduced diameter portions extending from each side of said central portion, one of said reduced diameter portions being larger in diameter than said protuberant circular end portion of said second body member and provided with a circular tapering cavity, the surface of said tapering cavity functioning as a seat for said circular terminal end of said protuberant portion of said second body member; and
  (d) a spring member located within said chamber of said first body member and supported at one end by said inwardly extending portion at the closed end of said first body member and at the other end by the other reduced diameter portion of said poppet member, said spring member being of helical shape with closed substantially flat ends; whereby said poppet member is normally held against said second body member by said spring member, and whereby associated fluid pressure passing through said aperture in said second body member against said poppet member moves said poppet member away from said second body member thereby providing communication between said aperture of said second body member and said aperture of said first body member.

2. The relief valve defined in claim 1, additionally including:
  means for adjusting the tension of said spring member.

3. The relief valve defined in claim 1, wherein:
  each end of said relief valve defines a substantially flat surface.

4. A fluid relief valve comprising:
  (a) a first body member, said first body member being open at one end thereof to define a chamber therein, said first body member including a flange portion at the open end thereof, and being provided with internal threads and at least one aperture adjacent said flange portion, said first body member additionally including an inwardly extending protuberant portion at the closed end thereof;
  (b) a second body member threadedly interconnected with the internal threads of said first body member, said second body member being provided with a protuberant portion extending into said chamber of said first body member and terminating in a circular configuration, said second body member being provided with an aperture extending therethrough, said aperture being coaxial with respect to said protuberant portion of said second body member;

(c) a poppet member movably positioned within said chamber of said first body member, said poppet member including a central portion and reduced diameter portions extending from each side of said central portion, one of said reduced diameter portions being provided with a circular tapering cavity, the surface of said tapering cavity functioning as a seat for said circular terminal end of said protuberant portion of said second body member;

(d) a spring member located within said chamber of said first body member and supported at one end by said inwardly etxending portion at the closed end of said first body member and at the other end by the other reduced diameter portion of said poppet member, whereby said poppet member is normally held against said second body member by said spring member, and whereby associated fluid pressure passing through said aperture in said second body member against said poppet member moves said poppet member away from said second body member thereby providing communication between said aperture of said second body member and said aperture of said first body member;

(e) a housing, said housing being closed at one end, said housing being provided with a plurality of apertures, at least one of said apertures being in said closed end of said housing and at least one of said apertures being in the wall surface of said housing;

(f) means for retaining said first and second body members within said housing such that said aperture of said housing closed end is in communication with said aperture of said second body member and said aperture in said housing wall surface is in communication with said aperture in said first body member; and (g) sealing means for preventing communication between said housing closed end aperture and said housing wall surface aperture.

References Cited

UNITED STATES PATENTS

| | | | |
|---|---|---|---|
| 254,130 | 2/1882 | Harrison | 251—333 |
| 541,633 | 6/1895 | Schoonmaker | 137—327 X |
| 2,875,779 | 3/1959 | Campbell | 137—543.17 X |
| 2,922,432 | 1/1960 | Huntington et al. | 137—454.2 X |
| 3,192,949 | 7/1965 | De See | 137—540 |

FOREIGN PATENTS 859,603  12/1952  Germany.

OTHER REFERENCES

Wahl: Mechanical Springs, 2nd Edition, 1963, pp. 65–67.

WILLIAM F. O'DEA, *Primary Examiner.*

D. H. LAMBERT, *Assistant Examiner.*